United States Patent
Anderson et al.

(10) Patent No.: US 11,134,607 B2
(45) Date of Patent: Oct. 5, 2021

(54) SEED CONDUIT SYSTEM

(71) Applicant: CNH Industrial America LLC, New Holland, PA (US)

(72) Inventors: Brian Anderson, Yorkville, IL (US); Chad Johnson, Arlington Heights, IL (US); Johnathon Dienst, Dekalb, IL (US); Kregg Raducha, Chicago, IL (US); Austin McLuckie, Coal City, IL (US)

(73) Assignee: CNH Industrial America LLC, New Holland, PA (US)

( * ) Notice: Subject to any disclaimer, the term of this patent is extended or adjusted under 35 U.S.C. 154(b) by 436 days.

(21) Appl. No.: 16/160,919

(22) Filed: Oct. 15, 2018

(65) Prior Publication Data
US 2020/0113127 A1    Apr. 16, 2020

(51) Int. Cl.
| A01C 7/20 | (2006.01) |
| A01C 7/08 | (2006.01) |
| A01B 49/06 | (2006.01) |

(52) U.S. Cl.
CPC ............. *A01C 7/206* (2013.01); *A01C 7/08* (2013.01); *A01B 49/06* (2013.01)

(58) Field of Classification Search
CPC .......... A01C 7/206; A01C 7/08; A01B 49/06
See application file for complete search history.

(56) References Cited

U.S. PATENT DOCUMENTS

| 680,748 | A | * | 8/1901 | Welling | A01C 7/206 193/9 |
| 3,554,409 | A | * | 1/1971 | Gandrud | A01B 49/06 222/610 |
| 4,031,834 | A | * | 6/1977 | Klenke | A01C 7/205 111/195 |
| 4,911,090 | A | * | 3/1990 | Schimke | A01C 7/206 111/150 |
| 5,271,343 | A | * | 12/1993 | House | A01C 5/062 111/170 |
| 5,983,813 | A | * | 11/1999 | Swab | A01C 7/081 111/150 |
| 6,332,413 | B1 | * | 12/2001 | Stufflebeanm | A01C 7/206 111/170 |
| 7,152,540 | B1 | * | 12/2006 | Sauder | A01C 7/206 111/170 |
| 7,426,894 | B2 | * | 9/2008 | Peterson | A01C 7/082 111/174 |
| 7,584,707 | B2 | * | 9/2009 | Sauder | A01C 7/206 111/140 |
| 7,588,091 | B1 | * | 9/2009 | Neudorf | A01C 5/062 172/773 |

(Continued)

FOREIGN PATENT DOCUMENTS

EP         3053426 B1 *  8/2017 ............. A01C 7/206

*Primary Examiner* — Jamie L McGowan
(74) *Attorney, Agent, or Firm* — Rebecca L. Henkel; Rickard K. DeMille

(57) ABSTRACT

A seed conduit defining a first end and a second end. The first end couples to a storage container and the second end to a planter shoe. The seed conduit includes a first flange coupled to and extending away from the second end of the seed conduit. The first flange extends into a gap defined by the planter shoe to deliver product from the storage container to a trench. The seed conduit includes a first support rib coupled to the first flange.

17 Claims, 6 Drawing Sheets

(56) References Cited

U.S. PATENT DOCUMENTS

| | | | |
|---|---|---|---|
| 7,814,849 B1 * | 10/2010 | McOmber | A01C 7/206 111/174 |
| 8,499,703 B2 * | 8/2013 | Hagny | A01C 7/206 111/121 |
| 8,631,749 B2 * | 1/2014 | Sauder | A01C 7/105 111/200 |
| 2006/0032420 A1 * | 2/2006 | Kester | A01C 5/062 111/170 |
| 2016/0219782 A1 * | 8/2016 | Schaffert | A01C 7/06 |
| 2020/0022302 A1 * | 1/2020 | Kile | A01C 7/084 |

* cited by examiner

SEED CONDUIT SYSTEM

BACKGROUND

The present disclosure relates to agricultural equipment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Seeding implements are used by farmers to facilitate planting. Seeding implements are typically towed across fields behind a tractor or other work vehicle. In operation, the seeding implements open a trench in the soil with a ground engaging tool. After opening a trench in the soil with the ground engaging tool, the seeding implement transfer seeds from a hopper to the trench through a conduit. After depositing seeds in the trench, the agricultural implement pushes soil over the seeds to cover the seeds and fill the trench. The sizes of seeds may vary depending on the type of plant. Unfortunately, some seeds may become stuck in the conduit between the hopper and the trench blocking additional seeds from being deposited in the trench or interfering with a desired seed spacing.

BRIEF DESCRIPTION

In one embodiment, an agricultural system that includes a toolbar and a row unit coupled to the toolbar. The row unit includes a chassis coupled to the toolbar. A storage container couples to the chassis. The storage container carries a product for distribution. A seed conduit defines a first end and a second end, with the first end coupling to the storage container, and a first flange and a second flange extending from the second end. The system includes a planter shoe with a first wall and a second wall separated by a gap. The planter shoe contacts the second end of the seed conduit and blocks the second end from extending into the gap. The first flange and the second flange extend into the gap and guide product exiting the second end of the seed conduit into a trench.

In another embodiment, a system including a seed conduit defining a first end and a second end. The first end couples to a storage container, and a first flange and a second flange extend from the second end. A planter shoe includes a first wall and a second wall separated by a gap. The planter shoe contacts the second end of the seed conduit and blocks the second end from extending into the gap. The first flange and the second flange extend into the gap and guide product exiting the second end of the seed conduit into a trench.

In another embodiment, a seed conduit defining a first end and a second end. The first end couples to a storage container and the second end to a planter shoe. The seed conduit includes a first flange coupled to and extending away from the second end of the seed conduit. A second flange couples to and extends away from the second end of the seed conduit. The first flange and the second flange extend into a gap defined by the planter shoe to deliver product from the storage container to a trench. The seed conduit includes a first support rib coupled to the first flange and a second support rib coupled to the second flange.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
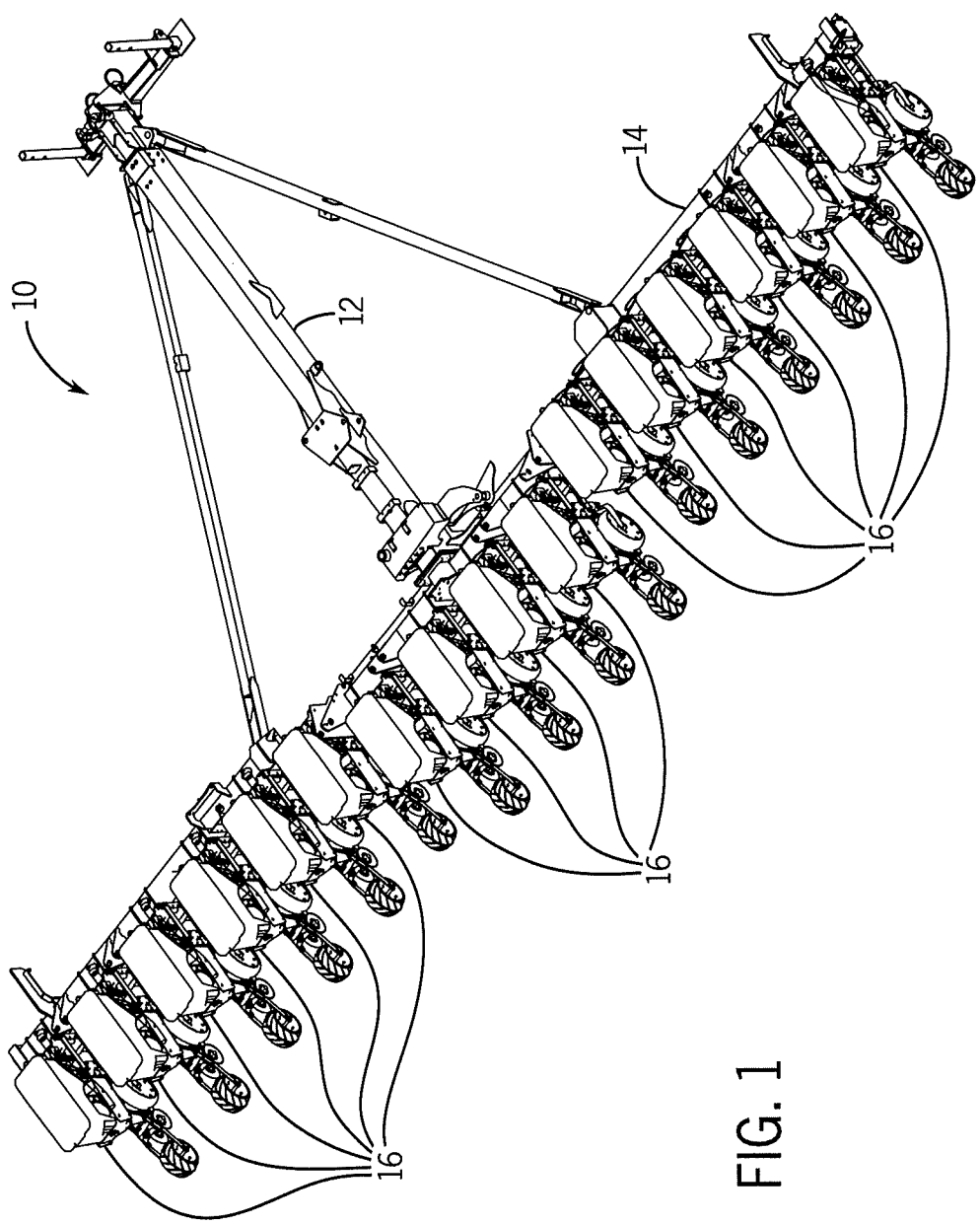
FIG. 1 is a perspective view of an embodiment of an agricultural implement.

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that embodiments may be practiced without these specific details. In other instances, well-known methods, procedures, components, have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Modern farming uses a variety of agricultural implements to harvest crops, prepare the soil for planting, and for planting. These agricultural implements are commonly referred to as harvesters, tillers, and planters. Planters enable seed planting by first opening a trench in the soil with an opening system. The planter then deposits seeds into the trench from a hopper or product storage container through a seed conduit, after which the trench is covered with soil by a closing system. In order to optimize the yield of some crops, there may be an optimal distance between seeds. This distance enables the plants in each row to receive sufficient light, water, fertilizer, and space to grow, which may increase crop production from a given piece of land. Undesirable spacing between plants may stunt the growth of the seeds as the plants compete for nutrients, which may result in unharvestable crops and thus wasted seed and fertilizer. Different plants have seeds of different sizes. Because the planter is capable of planting a variety of crops, the seed conduit facilitates movement of a variety of seeds from the hopper to the trench. The embodiments below describe a seed conduit that increases the size of the seed conduit outlet while still guiding the seeds into the trench.

Turning now to the drawings, FIG. 1 is a perspective view of an agricultural implement or system 10 (e.g., planter). The implement 10 is designed to be towed behind a work vehicle such as a tractor. The implement 10 includes a tongue assembly 12 which is shown in the form of an A-frame hitch assembly. The tongue assembly 12 may include a hitch used to attach to an appropriate tractor hitch via a ball, clevis, or other coupling. For example, a tongue of the implement 10 may be connected to a drawbar of the tractor, or a mast of the implement may be connected to a 3-point hitch of the tractor. The tongue assembly 12 is coupled to a toolbar 14, which supports multiple seeding implements or row units 16. The toolbar 14 includes multiple sections that couple together at pivot points. The ability of the sections to pivot relative to each other enables the implement 10 to plant on uneven ground.

Each row unit 16 may include an opener disk or disks rotatably coupled to a chassis of the row unit 16 and configured to the engage soil. The row unit 16 also includes a gauge wheel assembly movably coupled to the chassis. The gauge wheel assembly includes a gauge wheel or wheels configured to rotate across a soil surface to limit a penetration depth of the opener disk into the soil. In addition, the row unit 16 includes a depth control actuator extending between the chassis and the gauge wheel assembly. The depth control actuator is configured to adjust the penetration depth of the opener disk by varying the position of the gauge wheel relative to the chassis. A down force actuator extending between the toolbar and the chassis is configured to vary a contact force between the gauge wheel and the soil surface. Each row unit 16 may also include a closing system that closes the trench formed by the opening system.

Figure 2:
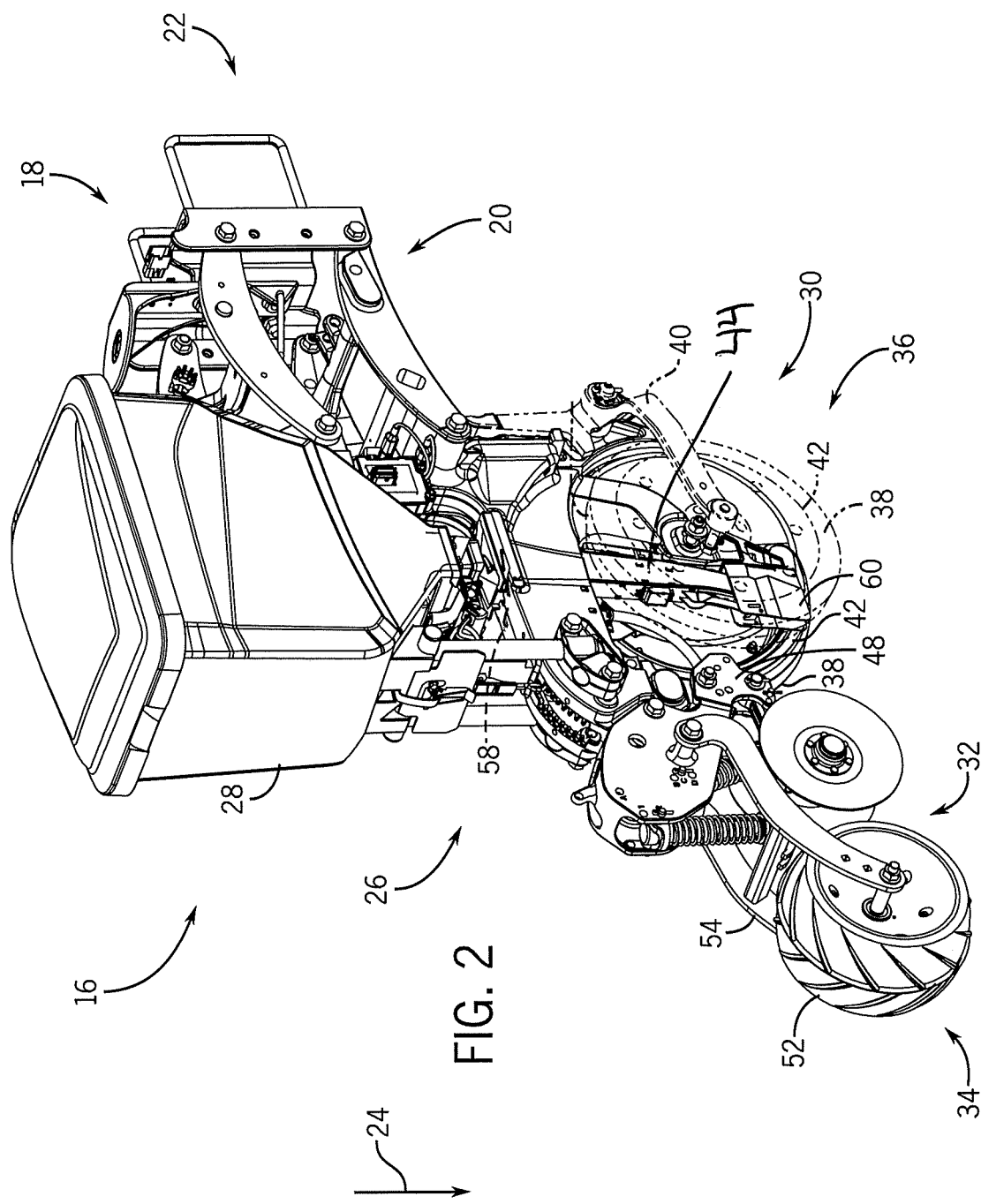
FIG. 2 is a perspective side view of an embodiment of a row unit of the agricultural implement in FIG. 1.

FIG. 2 is a side view of an exemplary row unit 16 of the agricultural implement 10 shown in FIG. 1. The row unit 16 includes parallel linkage elements 18 of a parallel linkage assembly, also known as a four bar linkage, configured to couple the row unit 16 to the toolbar 14 (e.g., toolbar sections), while enabling vertical movement of the row unit 16. In addition, a down force actuator 20 extends between a mounting bracket 22 and a lower portion of the parallel linkage to establish a contact force between the row unit 16 and the soil. The down force actuator 20 is configured to apply a force to the row unit 16 in a downward direction 24, thereby driving a ground engaging tool into the soil. As will be appreciated, a desired level of down force may vary based on soil type, the degree of tillage applied to the soil, soil moisture content, amount of residue cover, and/or tool wear, among other factors. Because such factors may vary from one side of the implement 10 to the other, a different level of down force may be selected for each row unit 16.

Furthermore, a desired level of down force may be dependent on the speed at which the row unit 16 is pulled across the field. For example, as speed increases, the ground engaging tools may have a tendency to rise out of the ground due to the interaction between the soil and the tool. Consequently, a greater down force may be applied during higher speed operation to ensure that the ground engaging tools remain at a desired depth. In addition, the weight of the row unit 16 applies a force to the ground engaging tools in the downward direction 24. However, as seeds and/or other products are transferred from a storage container on the row unit 16 to the soil, the weight of the row unit 16 decreases. Therefore, the down force actuator 20 may apply a greater force to the row unit 16 to compensate. Because each row unit 16 includes an independent down force actuator 20, the contact force may vary across the implement 10, thereby establishing a substantially uniform seed deposition depth throughout the field.

In the present embodiment, the parallel linkage elements 18 are pivotally coupled to a chassis 26. The chassis 26 may be configured to support various elements of the row unit 16 such as a metering system and a product storage container 28 (e.g., hopper). As illustrated, the chassis 26 supports an opener assembly 30, a closing assembly 32, and a press wheel assembly 34. In the present configuration, the opener assembly 30 includes a gauge wheel assembly 36 having two gauge wheels 38 and rotatable arms 40, which function to movably couple the gauge wheel 38 to the chassis 26. The gauge wheel 38 may be positioned a vertical distance above opener disks 42 to establish a desired trench depth for seed deposition into the soil. As the row unit 16 travels across a field, the opener disks 42 excavate a trench into the soil, and seeds are deposited into the trench. The opener assembly 30 also includes a depth control cylinder that couples to the rotatable arm 40 of the gauge wheel assembly 36. The depth control cylinder is configured to adjust the penetration depth of the opener disks 42 by varying a position of the gauge wheels 38 relative to the chassis 26.

Seeds and/or particulate (e.g., fertilizer) may be deposited via a seed conduit 44 extending between the product storage container 28 and the excavated trench. An outlet of the seed conduit 44 may be positioned aft of the opener assembly 30 and forward of the closing assembly 32 such that seeds flow into the trench. After depositing seeds into the trench, the closing disks 46 of the closing assembly 32 push the recently excavated soil back into the trench, thereby covering the seeds. As illustrated, the closing assembly 32 includes an arm 48 extending between the chassis 26 and the closing disks 46. While two closing disks 46 are shown in the present embodiment, it should be appreciated that alternative embodiments may include one closing disk 46. In addition, certain embodiments may employ closing wheel(s) instead of the illustrated closing disks 46.

A press wheel 52 of the press wheel assembly 34 is positioned aft of the closing assembly 32, and serves to pack soil on top of the deposited seeds. In the present embodiment, the press wheel assembly 34 includes an arm 54 extending between the chassis 26 and the press wheel 52. A press wheel cylinder 56 is coupled to the arm 54 of the press wheel assembly 34, and configured to regulate a contact force between the press wheel 52 and the soil. For example, in dry conditions, it may be desirable to firmly pack soil directly over the seeds to seal in moisture. In damp conditions, it may be desirable to leave the soil over the seeds fairly loose in order to avoid compaction which may result in seed crusting. The process of excavating a trench into the soil, depositing seeds within the trench, closing the trench and packing soil on top of the seeds establishes a row of planted seeds within a field. By employing multiple row units 16 distributed along the toolbar 14, as shown in FIG. 1, multiple rows of seeds may be planted within the field.

As explained above, seeds and/or particulate are deposited within the excavated trench via the seed conduit 44 that extends between the product storage container 28 at a first end 58 and planter shoe 60 at a second end 62. In some embodiments, the seed conduit 44 may couple to a product meter located between the product storage container and the first end 58. In operation, the planter shoe 60 blocks excavated soil from flowing back into the trench immediately after excavating the trench. The seeds and/or particulate therefore flow through the seed conduit 44 and the planter shoe 60 to the trench. As will be explained below, in order to increase space for seeds and/or particulate to flow through the planter shoe 60, an outlet of the seed conduit 44 does not extend into the planter shoe 60. Instead, the seed conduit 44 includes one or more flanges that extend beyond the outlet and into the planter shoe 60 to guide seeds and/or particulate through the planter shoe 60 and into the trench.

Figure 3:
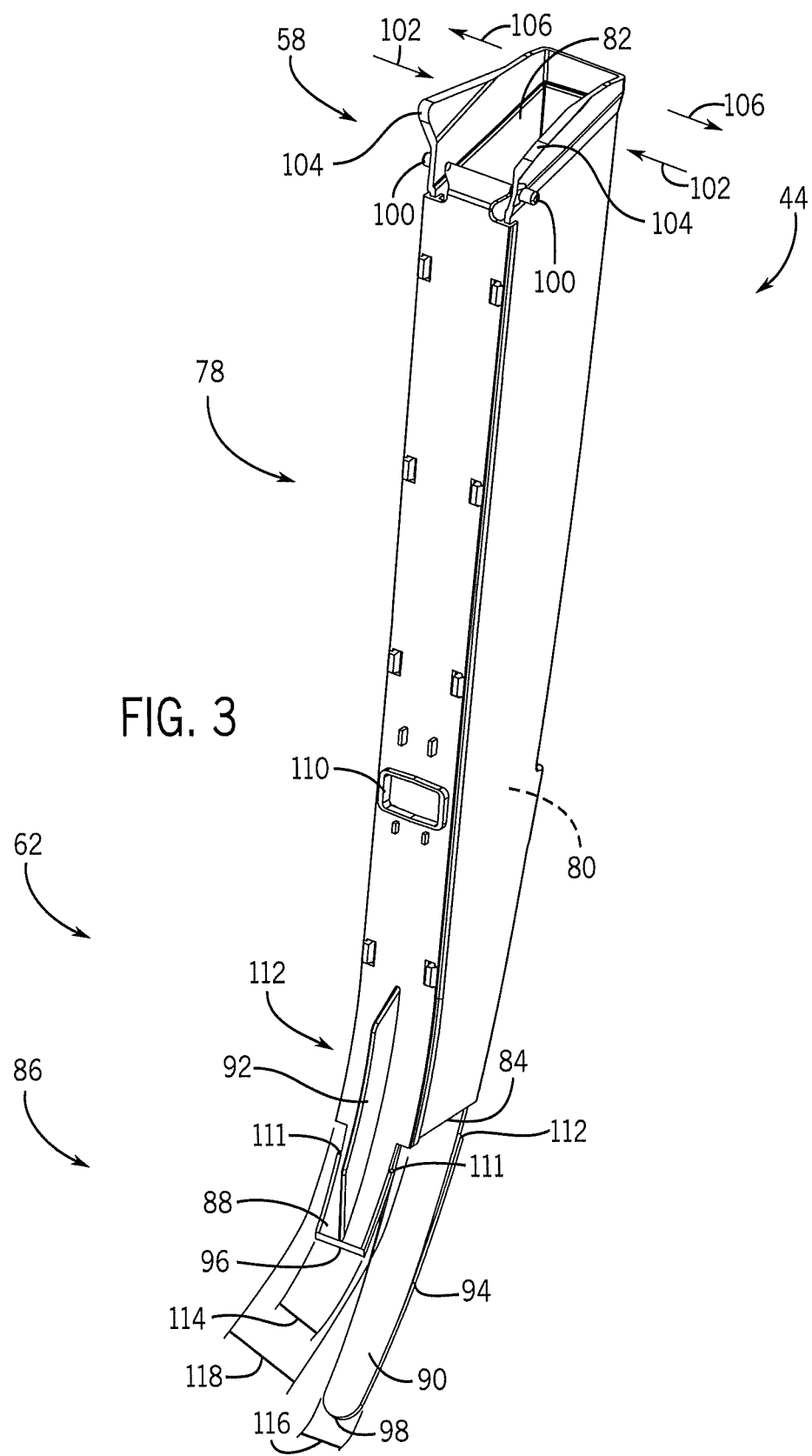
FIG. 3 is a perspective view of an embodiment of a seed conduit.

FIG. 3 is a perspective view of an embodiment of the seed conduit 44. The seed conduit 44 includes a main body 78 having the first end 58 and the second end 62. An aperture 80 extends through the main body 78 between the first end 58 and the second end 62 to enable seeds and/or particulate to flow from the product storage container 28 to the planter shoe 60. As illustrated, the size of the aperture 80 decreases from the first end 58 to the second end 62. Indeed, the aperture 80 decreases in size from an inlet 82 to an outlet 84. In order to increase the size of the outlet 84, and thus minimize or reduce seeds and/or particulate from jamming within the seed conduit 44, the outlet 84 does not extend into the planter shoe 60. In other words, the main body 78 is truncated and therefore the aperture 80 does not continue to decrease in size in order for the main body 78 to fit within the planter shoe 60. However, in order to guide seeds and/or particulate through the planter shoe 60, the seed conduit 44 includes one or more flanges 86 that extend into the planter shoe 60.

In some embodiments, the seed conduit 44 may include first and second flanges 88, 90 that extend past the second end 62 of the main body 78 in order to guide seeds and/or particulate exiting the outlet 84 through the planter shoe 60. As illustrated, the first and second flanges 88 and 90 may curve in order to guide seeds and/or particulate into the trench. To maintain and/or strengthen this curved profile the flanges 88 and 90 may include respective supporting/strengthening ribs 92 and 94. These ribs 92 and 94 may increase the rigidity of the flanges 88 and 90. It should be understood that in some embodiments the flanges 88 and 90 may include more than one rib (e.g., 1, 2, 3).

The supporting ribs 92, 94 couple to the respective flanges 88, 90 as well as to the main body 78. In some embodiments, the rib 92 and/or 94 may extend from respective ends 96 and 98 of the flanges 88 and 90 to points on the main body 78 between the inlet 82 and the outlet 84. In other embodiments, the ribs 92 and/or 94 may couple to the flanges 88 and 90 between the respective ends 96 and 98 of the flanges 88 and 90 and points on the main body 78 between the inlet 82 and the outlet 84. As will be explained below, the ribs 92 and/or 94 may also facilitate positioning of the seed conduit 44 on the row unit 16 by contacting stops on the planter shoe 60 or by contacting the row unit chassis 26. For example, by contacting a stop(s) the ribs 92 and/or 94 may facilitate placement (e.g., clocking position) of the seed conduit 44 with respect to the row unit chassis 26 to improve the consistency of the seed trajectory into the seed trench (e.g., seed conduit 44 is held at a constant angle).

In order to couple the seed conduit 44 to the row unit 16, the main body 78 may include pins 100. These pins 100 are configured to engage, for example, the chassis 26 by extending into slots. For example, the pins 100 may be moved inward in direction 102 by compressing tabs 104. Once the pins 100 are aligned with slots in the chassis 26 pressure on the tabs 104 may be released enabling the pins 100 to move outward in direction 106. In some embodiments, the main body 78 may also accommodate attachment of a sensor system (e.g., measurement/counter system). In order to accommodate a sensor system, the seed conduit 44 may include one or more apertures 110 in the main body 78. The aperture 110 enables the sensor to either extend into or provide access to the aperture 80 that extends through the main body 78 and thus facilitate measuring and/or counting an amount of seeds and/or particulate flowing through the seed conduit 44.

In some embodiments, the flanges 88 and 90 may define respective grooves 111 and 112 proximate the second end 62 of the main body 78. In other embodiments, there may not be grooves between the second end 62 of the main body 78 and the flanges 88 and 90. Furthermore, the first and second flanges 88 and 90 define respective maximum widths 114 and 116 that are less than a maximum width 118 of the second end 62 of the main body 78. Because the maximum widths 114 and 116 are less than a maximum width 118 of the second end 62 of the main body 78, the flanges 88 and 90 are able to enter a gap in the planter shoe 60 and guide particulate flowing through the seed conduit 44 to the trench while increasing the size of the outlet 84. This may enable large seed and/or particulate to freely flow through the seed conduit 44 and planter shoe 60 to the trench.

Figure 4:
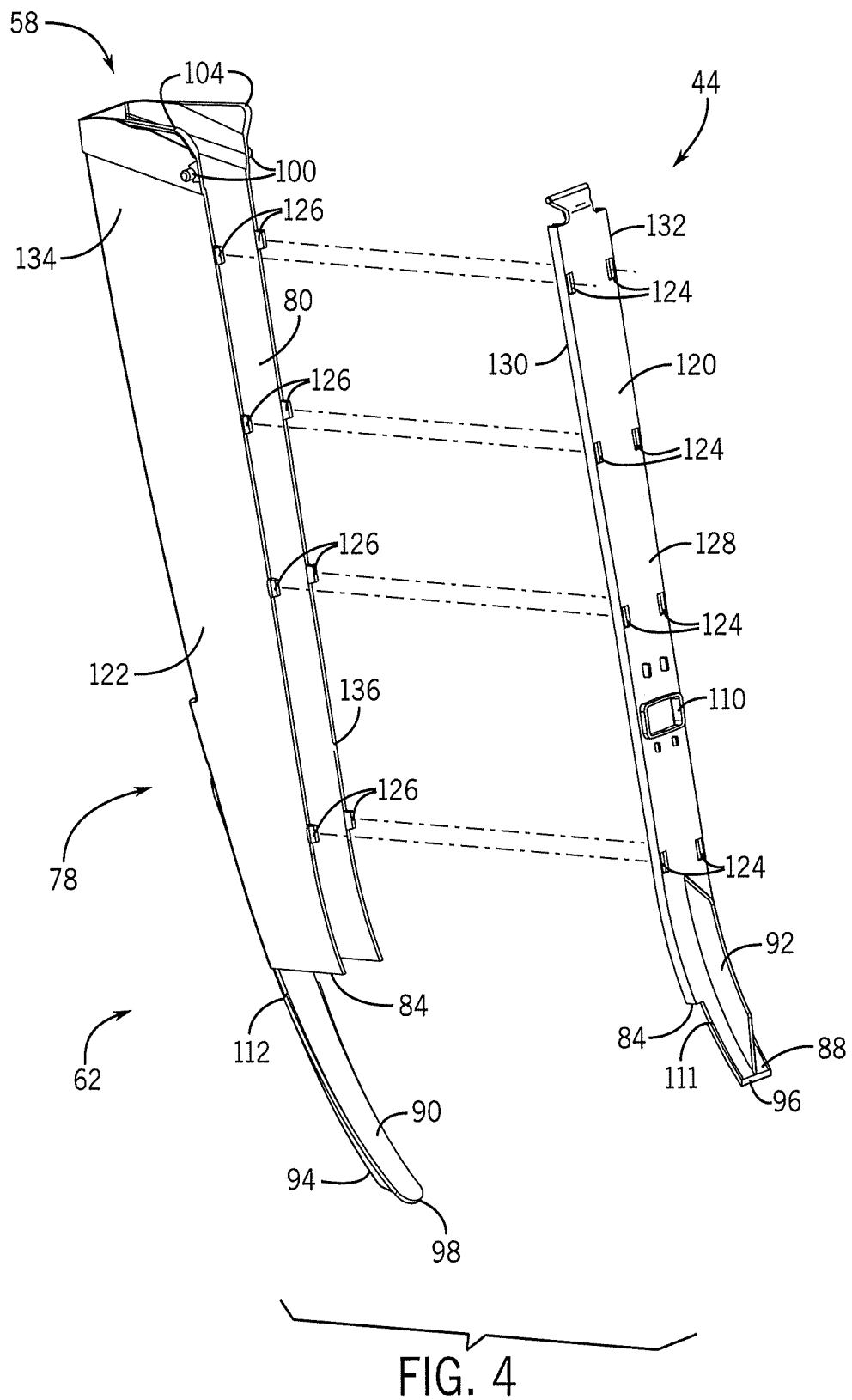
FIG. 4 is a perspective exploded view of an embodiment of a seed conduit.

FIG. 4 is a perspective exploded view of an embodiment of the seed conduit 44. As illustrated, the seed conduit 44 may include multiple pieces that couple together. In some embodiments, these pieces may form a generally trapezoidal shape. For example, the seed conduit 44 may include a first piece or portion 120 and a second piece or portion 122. The first and second pieces 120 and 122 may couple together to form the main body 78 that defines the aperture 80. For example, the first piece or portion 120 may be a plate that couples to the second piece or portion 122. The first piece or portion 120 may define a plurality of apertures 124 that receive respective fasteners 126 on the second piece or portion 122. The fasteners 126 may be snap fit fasteners that extend through the apertures 124 that couple to an exterior surface 128 of the first piece or portion 120. In some embodiments, the first piece 120 may include opposing lips 130, 132 that extend over respective side walls 134, 136 of the second piece 122. It should be understood that in some embodiments the seed conduit 44 may be one-piece instead of multiple pieces assembled together.

Figure 5:
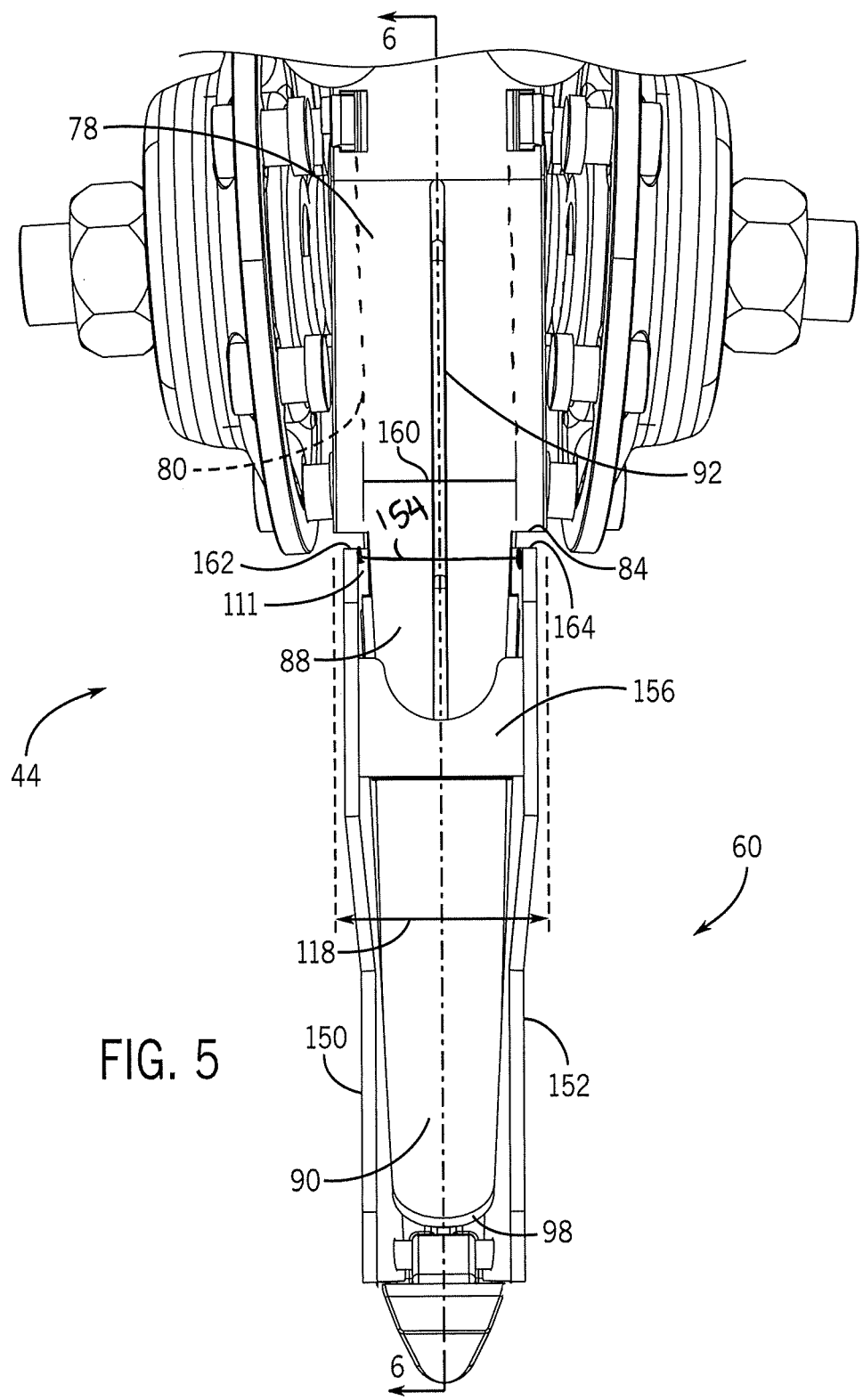
FIG. 5 is a partial rear view of an embodiment of a seed conduit and planter shoe.

FIG. 5 is a partial rear view of an embodiment of the seed conduit 44 coupled to the planter shoe 60. As illustrated, the planter shoe 60 includes a first plate 150 coupled to a second plate 152. The first and second plates 150, 152 are separated by a gap 154. It is through this gap 154 that the flanges 88, 90 extend into the planter shoe 60. The gap 154 is maintained with a flange 156 that extends between the first plate 150 and the second plate 152. As illustrated, the maximum width 118 of the second end 62 of the main body 78 is greater than the gap 154. Accordingly, the main body 78 is unable to enter the gap 154; instead, the second end 62 contacts the first and second plates 150 and 152. Accordingly, the size of the outlet 84 may remain greater than if the second end 62 of the main body 78 were to extend into the planter shoe 60. In some embodiments, the maximum widths 114 and/or 116 of the respective first flange 88 and the second flange 90 are equal to or substantially equal to the gap 154. This may enable the flanges 88 and 90 to block and/or reduce particulate flowing through the seed conduit 44 from becoming wedged between the flanges 88 and 90 and the planter shoe 60. In some embodiments, a width 160 of the aperture 80 is less than the gap 154 to block particulate from contacting ends or lips 162 and 164 of the respective plates 150 and 152.

Figure 6:
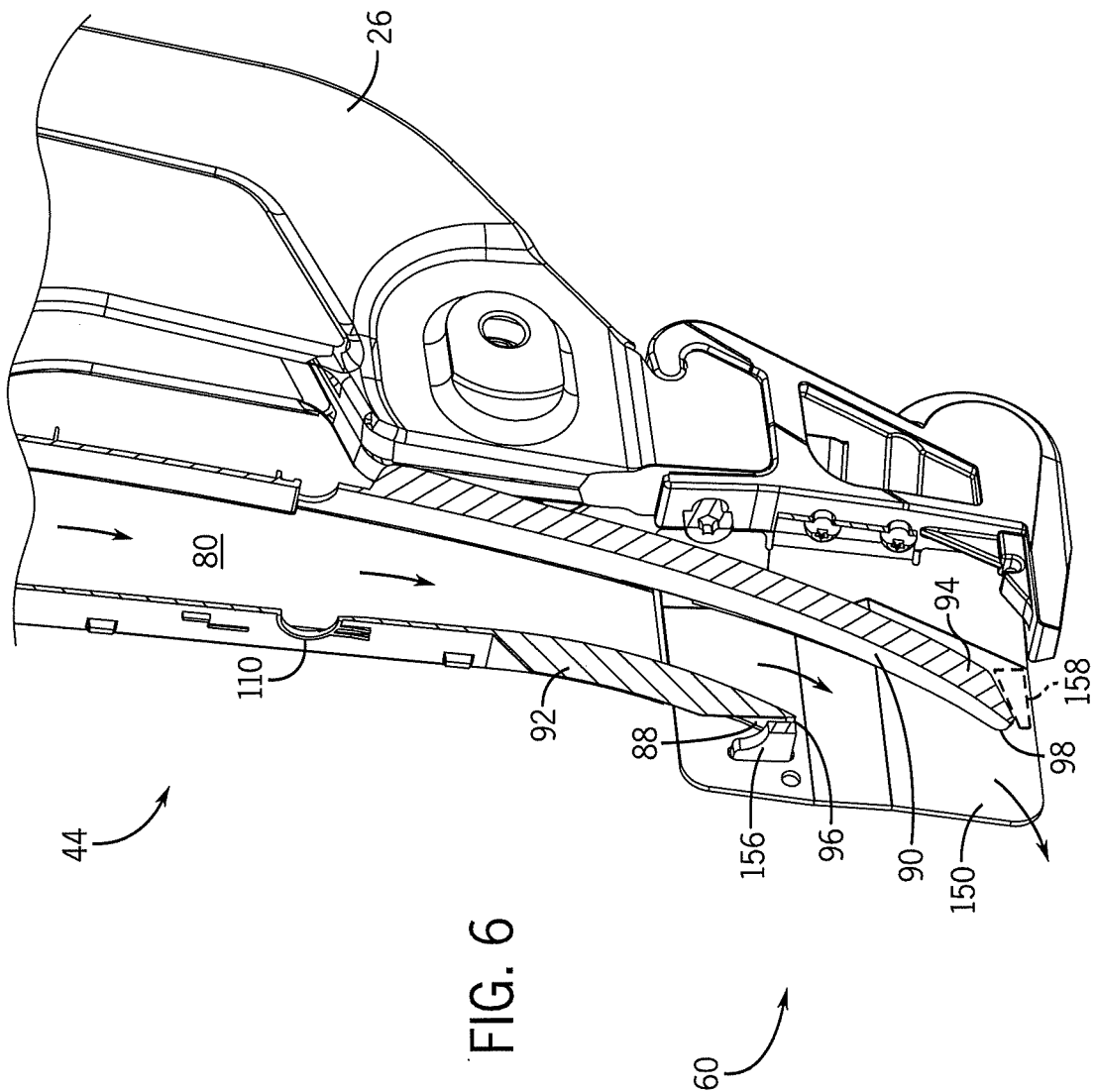
FIG. 6 is a partial cross-sectional perspective side view of an embodiment of a seed conduit and planter shoe along line 6-6 of FIG. 5.

FIG. 6 is a perspective side view of an embodiment of the seed conduit 44 and planter shoe 60. As illustrated, particulate is able to flow through the seed conduit 44 and into the planter shoe 60 through the aperture 80. In some embodiments, the end 96 of the flange 88 and/or the rib 92 may contact the flange 156 (e.g., stop) to improve the consistency of the seed trajectory into the seed trench (e.g., seed conduit 44 is held at a constant angle) and thus facilitate alignment of the seed conduit 44 on the row unit 16. In some embodiments, the end 98 of the flange 90 and/or the rib 94 may contact a stop 158 (e.g., stop) and/or the chassis 26 to likewise improve the consistency of the seed trajectory into the seed trench (e.g., seed conduit 44 is held at a constant angle) and thus facilitate alignment of the seed conduit 44 on the row unit 16.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

The invention claimed is:

1. An agricultural system, comprising:
    a toolbar;
    a row unit coupled to the toolbar, the row unit comprises:
        a chassis configured to couple to the toolbar;
        a storage container coupled to the chassis, the storage container is configured to carry a product for distribution;
        a seed conduit defining a first end and a second end, wherein the first end is configured to couple to the storage container, and wherein a first flange extends from the second end;
        a planter shoe comprises a first wall and a second wall separated by a gap, wherein the planter shoe is configured to contact the second end of the seed conduit and block the second end from extending into the gap, wherein the first flange extends into the gap and is configured to guide product exiting the second end of the seed conduit into a trench; and
        a second flange that extends from the second end, wherein the second flange extends into the gap and is configured to guide product exiting the second end of the seed conduit.

2. The system of claim 1, wherein the first flange and the second flange extend from opposing sides of the seed conduit.

3. The system of claim 1, wherein the first flange is longer than the second flange.

4. The system of claim 1, comprising a first support rib coupled to the first flange.

5. The system of claim 4, wherein the planter shoe comprises a first stop configured to contact the first support rib.

6. The system of claim 1, comprising a second support rib coupled to the second flange.

7. The system of claim 6, wherein the planter shoe comprises a second stop configured to contact the second support rib.

8. The system of claim 1, wherein the first flange and the second flange define a curved profile.

9. The system of claim 1, wherein the first flange defines a groove between the second end of the seed conduit and a distal end of the first flange.

10. The system of claim 1, wherein the second flange defines a groove between the second end of the seed conduit and a distal end of the second flange.

11. A system, comprising:
    a seed conduit defining a first end and a second end, wherein the first end is configured to couple to a storage container, the seed conduit comprises a first flange extending from the second end;
    a planter shoe comprising a first wall and a second wall separated by a gap, wherein the planter shoe is configured to contact the second end of the seed conduit and block the second end from extending into the gap, wherein the first flange extends into the gap and is configured to guide product exiting the second end of the seed conduit into a trench; and
    a second flange coupled to and extending away from the second end of the seed conduit, wherein the second flange is configured to extend into the gap defined by the planter shoe to deliver product from the storage container to the trench.

12. The system of claim 11, wherein the first flange is longer than the second flange.

13. The system of claim 11, comprising a first support rib coupled to the first flange.

14. The system of claim 13, wherein the planter shoe comprises a first stop configured to contact the first support rib.

15. The system of claim 11, comprising a second support rib coupled to the second flange.

16. The system of claim 15, wherein the planter shoe comprises a second stop configured to contact the second support rib.

17. A seed conduit, the seed conduit defining a first end and a second end, wherein the first end is configured to couple to a storage container and the second end to a planter shoe, the seed conduit comprises:
    a first flange coupled to and extending away from the second end of the seed conduit, wherein the first flange is configured to extend into a gap defined by the planter shoe to deliver product from the storage container to a trench;
    a first support rib coupled to the first flange; and
    a second flange coupled to and extending away from the second end of the seed conduit, wherein the second flange is configured to extend into the gap defined by the planter shoe to deliver product from the storage container to the trench.

* * * * *